Aug. 25, 1964   R. L. FILLMORE ET AL   3,145,623
TRACER HEAD WITH DAMPER
Filed March 4, 1963

INVENTORS,
Robert L. Fillmore,
BY Stanley S. Kintigh
Joseph E. Ryan
ATTORNEY

United States Patent Office 3,145,623
Patented Aug. 25, 1964

3,145,623
TRACER HEAD WITH DAMPER
Robert L. Fillmore, Mound, and Stanley S. Kintigh, Hopkins, Minn., assignors to Minneapolis-Honeywell Regulator Company, Minneapolis, Minn., a corporation of Delaware
Filed Mar. 4, 1963, Ser. No. 262,411
6 Claims. (Cl. 90—62)

Our invention relates to an improved tracer control apparatus particularly adapted for the control of machine tools and more particularly to an improved tracer head with damping incorporated therewith.

The improved tracer control apparatus of the present invention incorporates a simplified damper mechanism designed to damp the velocity oscillations imparted to the tracer feeler upon engagement with the templet in the operation of the machine tool. These oscillations or accelerations are experienced in the plane perpendicular to the axis of the feeler and a simplified damping unit is mounted on the feeler or movable axis of the tracer in a plane of experienced oscillations to damp the same and provide an improved tracer operation. The damping portion of the tracer control apparatus is simplified in design and economical to manufacture being readily adaptable for use in all types of tracer sensing heads having either electric, pneumatic or hydraulic transducers. It is therefore, an object of this invention to provide an improved tracer head having a simplified damping element unit therewith. Another object of this invention is to provide an improved tracer head with vibration damping means suspended on the stylus or feeler of the tracer head to eliminate the effect of oscillations on the operation of the tracer. These and other objects of this invention will become apparent from reading of the test description wherein:

Figure 1:
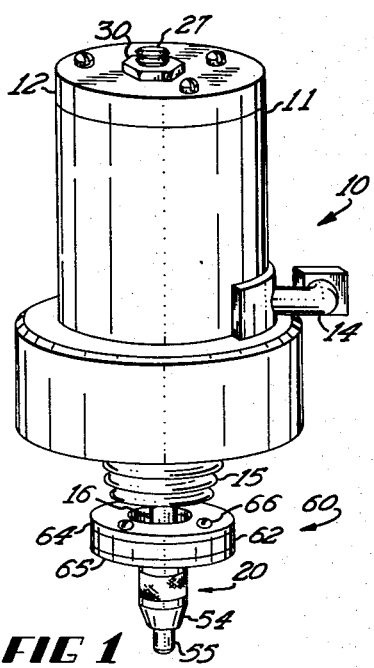
FIGURE 1 is a perspective view of a tracer head in block.

In FIGURE 1 is shown the perspective view of a tracer head of the electrical type indicated generally at 10 having a cylindrical casing 11, a cover part 12 and a connector portion 14 integral with the casing by means of which the electrical conductors are connected thereto. The stylus or operating arm of the tracer head is sealed within the casing by means of a flexible bellows means 15 with a portion of the stylus 16 extending therefrom terminating in a feeler means or connector 20 by means of which the feeler or actual contacting device may be connected to the tracer head.

Figure 2:
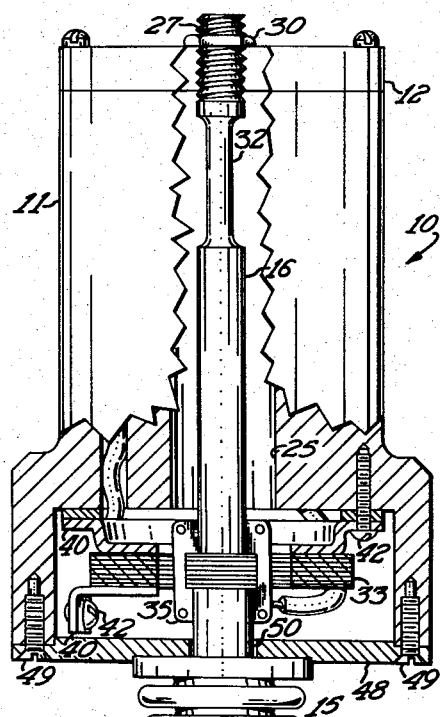
FIGURE 2 is the elevation view in section of the tracer head with damping applied thereto.

The apparatus is best seen in FIGURE 2 in which the tracer head with the damping means associated therewith is shown in section. Thus the casing 11 of the tracer which is shown in electrical form but may be of the hydraulic or pneumatic type has an aperture therein 25 in which is positioned the stylus 16. As shown in FIGURE 2 this stylus in the present embodiment may be connected to the cover part 12 through suitable connecting means such as the screw type fittings 27 with a locking means or nut 30 associated therewith. The stylus has a reduced section 32 and is generally flexible so that bending will occur at the reduced section 32 for allowing pivoting of the stylus 16 relative to the casing 10. Positioned within the aperture or cavity 25 of the casing 11 is the transducer which is shown herein in electrical form as incorporating a field element 33 having a plurality of poles thereon with associated windings 35 positioned on the poles. The field element is mounted to the casing 11 through suitable bracket means 40 and attached thereto by screws 42. Associated with the field element is an armature 45 which is generally cylindrical in form and is designed to be positioned relative to the poles (not shown in detail) to provide an electrical signal output from the tracer head.

As an example of the one type of tracer head which may be incorporated herein, reference is made to the J. J. Rudolph, Jr. et al. Patent 2,941,140 on a magnetic tracer head dated June 14, 1960. The stylus 16 or movable member carrying the relative movable part or armature 45 of the electric transducer of the tracer head is designed to be pivoted in the plane parallel to the axis of the tracer and in the present embodiment is a two axis type transducer. Casing part 11 includes a bottom plate 48 which is suitably connected to the casing 11 through suitable screw means 49 which part has an aperture 50 therein through which the stylus 16 extends. The bellows means 15 is attached at one extremity to the casing part or base 48 and at the other extremity to the shaft or stylus 16 for sealing the aperture 50. Mounted on the stylus 16 is the connecting member 20 which includes clamping means 54 by means of which a feeler 55 or actual templet engaging member may be mounted. Positioned remote from the fixed end of the shaft or stylus 16 is the damper element or member 60.

Figure 3:
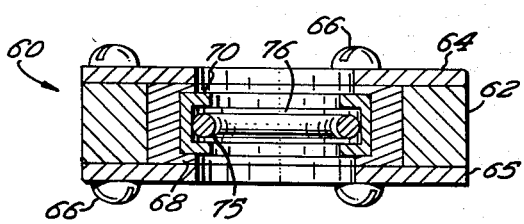
FIGURE 3 is a sectional view of the improved damping element.
Figure 4:
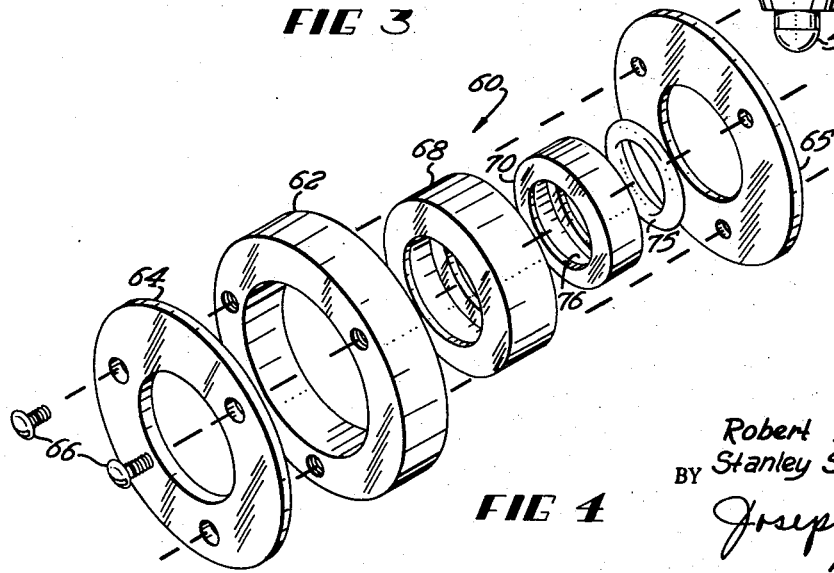
FIGURE 4 is an exploded view of the improved damping element.

This part will best be seen in FIGURES 3 and 4 as including an angular damping ring 62 and attached thereto a pair of circular side plates 64, 65 which plates are secured to the ring 62 through suitable screw means 66. Positioned within the angular damping ring 62 is an angular ring of compressible cellular material indicated generally at 68. The circular plates 64, 65 aid in retaining the angular ring of compressible cellular material 68 within the confines of the damping ring 62 and serve in supporting the angular ring 62 on an inner support ring 70 whose axial dimension is less than that of the ring 62 such that it does not engage or is not engaged by the side plate 64, 65 extending from ring 62. It does however, engage the inner diametrical surface of the angular ring 68 of damping or cellular material to provide a friction type fit therein as does the outer periphery of the material engage the inner circumferential surface of the angular ring 62. Thus then the accelerations imparted to the inner ring 70 will be taken up by means of displacement of and deformation of the material 68 caused by the mass of ring 62 connected thereto. The cellular material absorbs energy and thus acts as a damping agent so that the stylus will be practically unaffected by the accelerations. The ring 70 is adapted to be mounted on the shaft 16 through a suitable O ring or friction member 75 which fits into the grooved surface 76 in the support ring 70 and is adapted to be mounted on the stylus. Thus the damping member experiencing accelerations at a plane perpendicular to the axis of the stylus 16 will absorb the vibrations leaving the shaft 16 substantially unaffected thereby. This compressible cellular material will absorb the vibrations and provides a simplified structure in the form of a mass on the support to which the mass is connected to provide a simplified damping element.

The operation of the tracer head control apparatus is greatly improved with the addition of the damper making it insensible to accelerations imparted thereto in the plane of normal displacement of the tracer stylus during operation of the same. This damping operation or masking out of extraneous oscillations imparted to the device permits accurate and true displacement of the stylus causing positioning of the relatively movable parts of the transducer associated therewith or included therein to function smoothly and accurately. The simplified damping structure may be readily assembled on the standard stylus and would accommodate any tracer head since it is merely inserted over the stylus and held thereon through frictional engagement of the O ring 75 included therewith. The use of the compressible cellular material within the damping element eliminates relatively movable parts in the damping element simplifying the structure of the same and reducing the cost of the same.

In considering this invention it should be remembered the present disclosure is intended to be illustrative only and the scope of the invention should be determined only by the appended claims.

We claim as our invention:

1. A tracer apparatus for a machine tool, comprising; a housing, a signal producing transducer having a pair of relatively movable parts, means mounting one of said parts on and within said housing, a flexible shaft having a feeler means end associated therewith, means mounting said shaft for pivotal movement on said housing such that the feeler means end of said shaft is displaceable in a plane perpendicular to the axis of said shaft, means mounting the other of said relatively movable parts of said transducer on said shaft for movement relative to said one of said parts for operation of said transducer, and damper means including a pair of relatively movable parts connected by an element of compressible cellular material, one of said damper parts being connected to and mounted on the feeler means end of said shaft, the other of said damper parts being supported by said compressible cellular material and serving to remain relatively fixed in space as acceleration is imparted to said one of said damper parts.

2. A vibration damper for use with a machine tool tracer apparatus having a housing, a signal producing transducer having a pair of relatively movable parts, means mounting one of said parts on and within said housing, a flexible shaft having a feeler means end associated therewith, means including a reduced flexible portion on said shaft for mounting said shaft for pivotal movement on said housing such that the feeler means end of said shaft is displaceable in a plane perpendicular to the axis of said shaft, and means mounting the other of said relatively movable parts of said transducer on said shaft for movement relative to said one of said parts for operation of said transducer to produce a signal output therefrom, the vibration damper comprising; damper means including a pair of relatively movable parts connected by an element of compressible cellular material, one of said damper parts being adapted to be connected to and mounted on the feeler means end of the tracer apparatus shaft external of the housing, the other of said damper parts being supported only by said compressible cellular material and having a relatively high mass tending to remain fixed in space as accelerations are imparted to said one of said damper parts.

3. A tracer apparatus for a machine tool, comprising; a housing, a signal producing transducer having a pair of relatively movable parts, means mounting one of said parts on and within said housing, a flexible shaft having a feeler means associated therewith, means mounting said shaft on and within said housing such that a free end of said shaft with said feeler means thereon extends through an aperture in said housing, said shaft being flexible to permit pivotal movement with respect to said housing and displaceable in a plane perpendicular to the free end of said shaft, means mounting the other of said relatively movable parts of said transducer on said shaft within said housing for movement relative to said one of said parts for operation of said transducer to produce a signal output therefrom, damper means including a pair of relatively movable parts connected by an element of compressible cellular material, one of said damper parts being connected to and mounted on the free end of said shaft and the other of said damper parts being supported on said one of said damper parts only by said element of compressible cellular material, and flexible sealing means encircling the free end of said shaft and attached to said housing to seal the aperture therein permitting said displaceable movement of said shaft.

4. A tracer apparatus for a machine tool, comprising; a housing, a signal producing transducer having a pair of relatively movable parts, means mounting one of said parts on and within said housing, a flexible shaft having a feeler means end associated therewith, means mounting said shaft for pivotal movement on said housing such that the feeler means end of said shaft is displaceable in a plane perpendicular to the axis of said shaft, means mounting the other of said relatively movable parts of said transducer on said shaft for movement relative to said one of said parts for operation of said transducer, a damping element having an angular damping ring of relatively high mass and an inner supporting ring with a ring of compressible cellular material positioned therebetween supporting said damping ring on said support ring, retaining plates connected to one of said rings overlying and retaining said cellular material therebetween, and a friction ring positioned within a groove in said support ring and adapted to be mounted on the feeler means end of said shaft to provide a frictional mounting of said damping element thereon.

5. A vibration damper for use with a machine tool tracer apparatus having a housing, a transducer having a pair of relatively movable parts, means mounting one of said parts on and within said housing, a shaft having a feeler means end associated therewith, means including a reduced flexible portion on said shaft for mounting said shaft for pivotal movement on said housing such that the feeler means end of said shaft is displaceable in a plane perpendicular to the axis of said shaft, and means mounting the other of said relatively movable parts of said transducer on said shaft for movement relative to said one of said parts for operation of said transducer to produce an output therefrom; the vibration damper comprising; a damping element having an angular damping ring of relatively high mass and an inner supporting ring with a ring of compressible material positioned therebetween supporting said damping ring on said support ring, and retaining plates connected to said damping ring overlying and retaining said compressible material therebetween, said inner supporting ring having an internal diametrical dimension to permit mounting of said damping element on the feeler means end of the tracer apparatus shaft with a friction means therebetween.

6. A tracer apparatus for a machine tool comprising, a housing, a transducer having a pair of relatively movable parts, means mounting one of said parts on and within said housing, a shaft having a feeler means end associated therewith, means including a reduced flexible portion on said shaft for mounting said shaft for pivotal movement on said housing such that the feeler means end of said shaft is displaceable in a plane perpendicular to the axis of said shaft, means mounting the other of said relatively movable parts of said transducer on said shaft for movement relative to said one of said parts for operation of said transducer to produce an output therefrom, a damping element mounted external of said housing on the feeler means end of said shaft and including an angular damping ring of relatively high mass and an inner supporting ring with a ring of compressible cellular material positioned therebetween supporting said damping ring on said supporting ring, and a ring of friction material positioned within a groove in said supporting ring and adapted to be mounted on the feeler means end of said shaft to provide a frictional mounting for said damping element thereon.

References Cited in the file of this patent
UNITED STATES PATENTS
2,937,577   Morgan _____ May 24, 1960
FOREIGN PATENTS
170,957   Austria _____ Apr. 10, 1952